C. SCHEUNER.
SPRING TIRE.
APPLICATION FILED OCT. 2, 1913.
1,099,722.
Patented June 9, 1914.
2 SHEETS—SHEET 1.
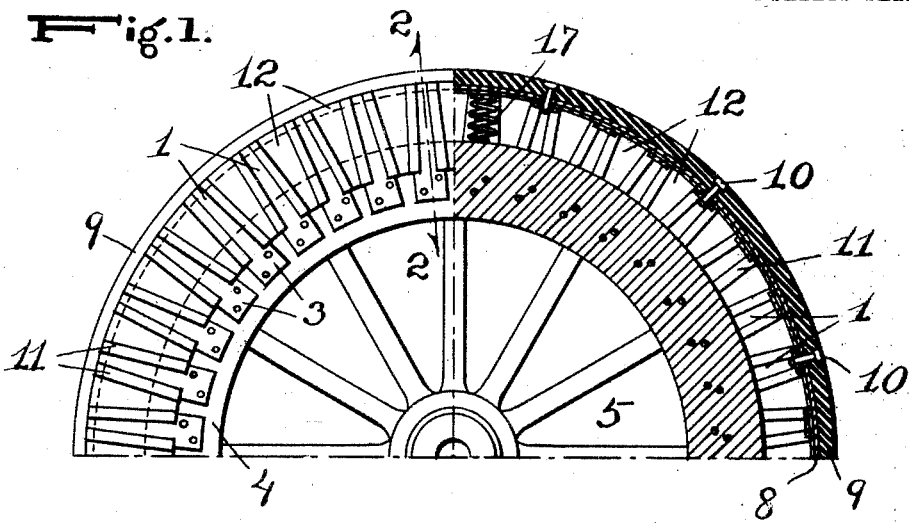
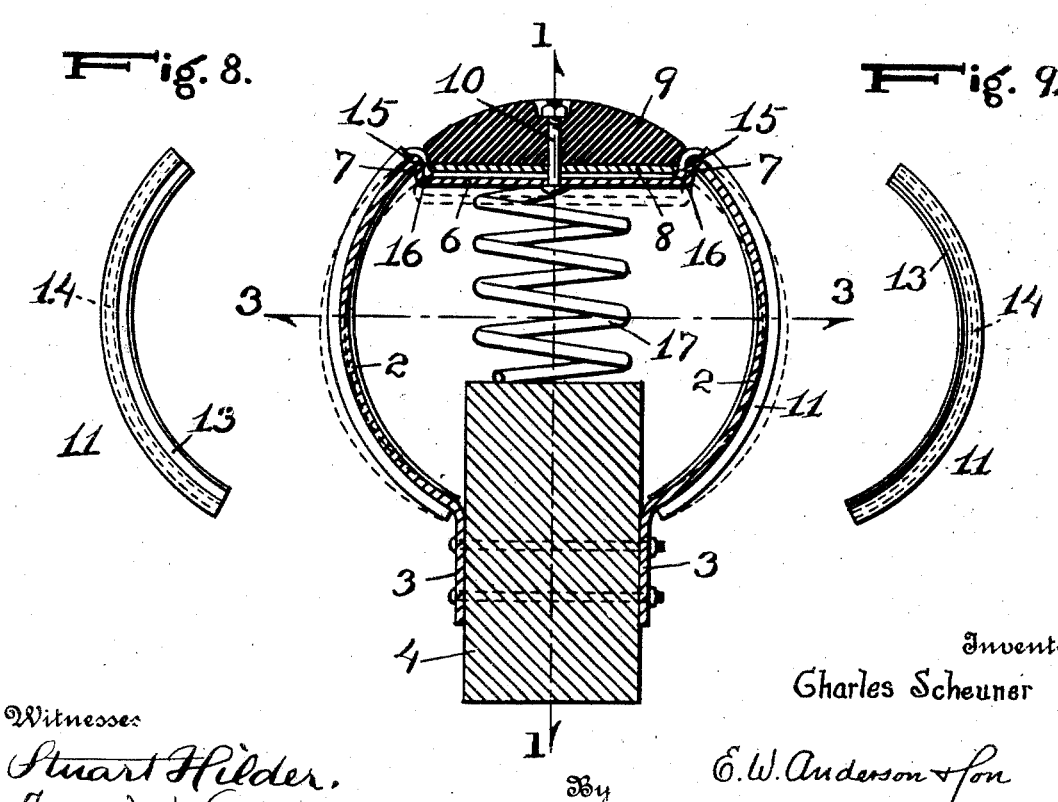
Witnesses
Stuart Hilder.
Frances W. Anderson.
Inventor
Charles Scheuner
By E. W. Anderson & Son
his Attorneys C. SCHEUNER.
SPRING TIRE.
APPLICATION FILED OCT. 2, 1913.
1,099,722.
Patented June 9, 1914.
2 SHEETS—SHEET 2.
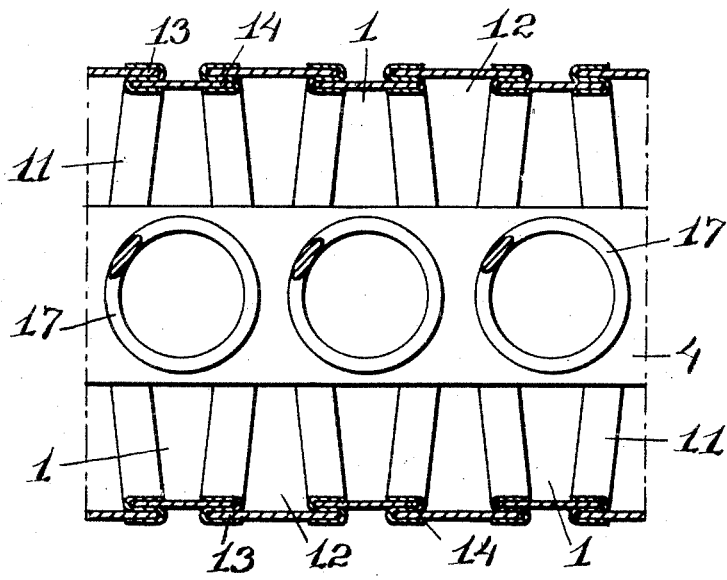
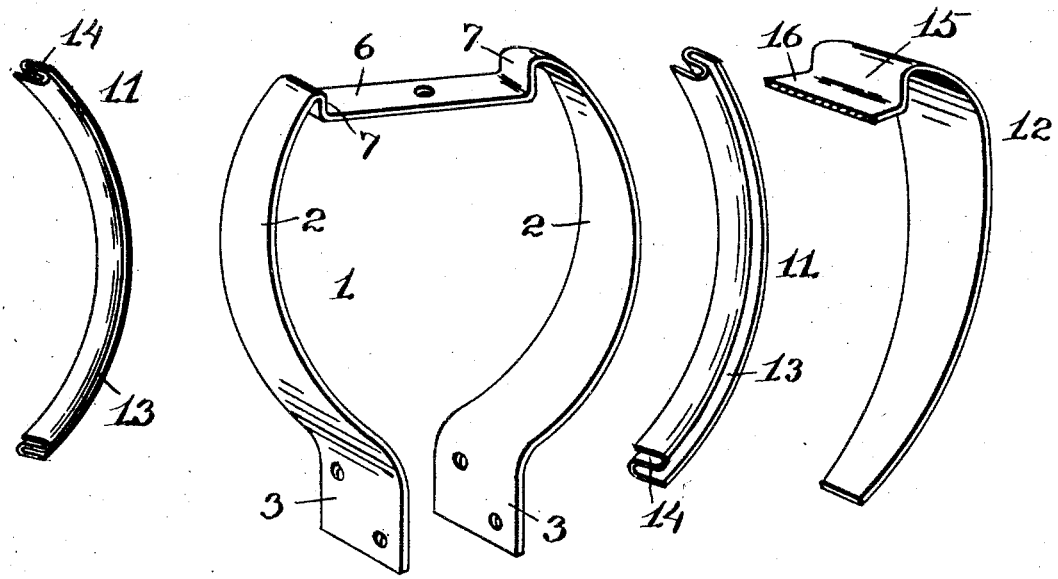
Witnesses
Stuart Hilder.
Francis W. Anderson.
Inventor
Charles Scheuner
By E. W. Anderson & Son,
his Attorneys

UNITED STATES PATENT OFFICE.

CHARLES SCHEUNER, OF CHICAGO, ILLINOIS.

SPRING-TIRE.

1,099,722.  Specification of Letters Patent. Patented June 9, 1914.

Application filed October 2, 1913. Serial No. 793,024.

*To all whom it may concern:*

Be it known that I, CHARLES SCHEUNER, a citizen of the United States, resident of Chicago, in the county of Cook and State of Illinois, have made a certain new and useful Invention in Spring-Tires; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to spring tires for motor cars and other vehicles, and it consists in the novel construction and combinations of parts, as hereinafter set forth.

The object of the invention is to provide certain improvements upon the spring tire of my Patent Number 1,007,392, dated October 31, 1911, to enable the spring supports for the tire to be made of sheet or plate spring metal of the same thickness throughout if desired, and to strengthen said spring supports against yielding too easily under strain.

In the accompanying drawing illustrating the invention Figure 1 is a view of a portion of a vehicle wheel having my invention applied thereto, and partly in side view and partly in section on the line 1—1, Fig. 2; Fig. 2 is a transverse section on the line 2—2, Fig. 1, parts being shown as pressed inwardly in dotted lines; Fig. 3 is a section on the line 3—3, Fig. 2; Fig. 4 is a detail perspective view of one of the spring supports; Fig. 5 is a detail perspective view of one of the filler plates, partly broken away; Fig. 6 is a detail perspective view of one of the stiffener springs, partly straightened for engagement with its spring support; Fig. 7 is a similar view of a stiffener spring in contracted form; Fig. 8 is a detail side view of a stiffener spring, partly straightened, and Fig. 9 is a similar view of a stiffener spring in contracted form.

In these drawings the numeral 1, designates a circumferential series of spring supports, having side members 2, of outward bowed form, offset or bent angularly at their inner ends at 3 for connection with the felly 4 of the wheel 5, each pair of outward bowed side members having an inward offset transverse connection 6, connected to the side members by shoulders 7, constituting one spring support, of which there are a suitable number arranged at regular intervals around the wheel.

Fitting within the recesses of the spring supports and resting or located upon the transverse arms 6, thereof is an annular spring plate 8, said plate bearing at its lateral edges against the shoulders 7. Fitting upon the annular spring plate is the annular tread 9 of rubber or the like, radial bolts 10, passing through the rubber tread and the annular spring metal plate at suitable intervals, and engaging the cross arms 6 of the spring supports.

The side arms 2 of the spring supports are usually of tapered form being of greater or increasing breadth toward their inner ends or bases where they have connection with the wheel felly. Each side arm 2 of each spring support is engaged by an arched spring plate 11 of approximately S-form in cross section, at each side of said side arm, there being two springs 11 for each side arm. The adjacent springs 11, of adjacent spring supports are connected by filler plates 12, also having side members of arched form, said plates 12 fitting within the outer channels 13 of the springs 11, the spring supports engaging the inner channels 14 of said springs 11.

The springs 11 are normally of an arch shape of comparatively small radius as shown in Fig. 7 of the drawings, and when applied to the spring supports are straightened out to an arch of longer radius as shown in Fig. 6 to increase the width of the channels 13 and 14 of the springs. The arch of longer radius of the springs 11 when thus straightened out corresponds to the arch or bow of the side arms of the spring supports with which the springs 11 are engaged.

It is designed that the width of the channels 13 and 14 of the springs 11 when partly straightened as shown in Fig. 6, to be engaged with the spring supports shall be considerably greater than the thickness of the side arms 2 of said supports and than the filler plates 12, whereby when the spring supports yield under strain to assume an arched form of smaller radius, the springs 11 will be allowed to yield to assume also an arched form of smaller radius, as will likewise the filler plates 12.

Usually the filler plates will be turned downward at their upper ends at 15, parallel to and in close engagement with the shoulders 7 of the spring supports, and offset inwardly at right angles to form cross arms 16, connecting the side members thereof and located above, close to and parallel with the cross arms of the spring supports, the annular spring plate 8 resting upon the cross arms 16 of the filler plates and at its edges against the shoulder bends 15 thereof. It is preferred to employ a series of coiled springs 17, between the springs 1 and the wheel felly.

What I claim is:—

1. In a spring tire, the combination with a series of radial springs spaced apart and having each oppositely bowed side arms connected at their inner ends to the wheel felly and provided at their outer ends with a cross arm connecting the side arms, of arc-form stiffener springs having each a channel, each bowed side arm of a radial spring fitting in said channel of the stiffener spring, and filling means between the stiffener springs.

2. In a spring tire, the combination with a series of radial separated springs connected to the wheel felly and having each outward bowed side arms and a cross arm connecting the side arms, of arc form springs of approximately S-form in cross section embracing said side arms, and filler plates of arc form engaging and connecting adjacent arc form springs.

3. In a spring tire, the combination with a series of radial separated springs connected to the wheel felly and having each outward bowed side arms and a cross arm connecting the side arms, and an annular spring plate and an annular tread strip upon and connected to the cross arms, of arc form channeled stiffener springs of approximately S-form in cross section embracing said side arms, and filler plates of arc form engaging the channels of and connecting adjacent arc form springs.

In testimony whereof I affix my signature, in presence of two witnesses.

CHARLES SCHEUNER.

Witnesses:
  W. RASMUSSEN,
  HANS WERNER.